Aug. 12, 1969   F. COWLISHAW ET AL   3,460,697
TRANSPORTABLE LOAD-CARRYING APPLIANCES
Filed Feb. 1, 1968   14 Sheets-Sheet 1

INVENTORS
FRANK COWLISHAW
FRANK TOWN
By Potter, Agent

INVENTORS
FRANK COWLISHAW
FRANK TOWN

United States Patent Office 3,460,697
Patented Aug. 12, 1969

3,460,697
TRANSPORTABLE LOAD-CARRYING APPLIANCES
Frank Cowlishaw, Linby, and Frank Town, Burton Joyce, England, assignors to W. E. & F. Dobson, Limited, Colwick, Nottingham, England
Filed Feb. 1, 1968, Ser. No. 702,269
Claims priority, application Great Britain, Feb. 7, 1967, 5,772/67; Apr. 4, 1967, 15,351/67; Aug. 16, 1967, 37,668/67
Int. Cl. B60p 1/64
U.S. Cl. 214—515
10 Claims

ABSTRACT OF THE DISCLOSURE

A transportable load-carrying appliance to be removably received on a transport vehicle and comprising a container, base frame, or other body structure having hydraulic legs which by suitable mounting means are displaceable between an outer operative position and an inner inoperative position within the vehicle width, said legs being in hydraulic circuit, with valve control devices, enabling extension of the legs in the outer operative position and contraction of the legs for the inner inoperative position, and there being also hydraulic jacks in the circuit for effecting the legs' displacements, locating catch devices displaced with the legs to co-operate with the vehicle for centralizing and locking the body structure on the vehicle, and helical slot and follower or hydraulic jack devices for converting the displacements of the legs to pivotal movements thereof so that the inner inoperative position is horizontal and the outer operative position is vertical, and the arrangement may be that the leg cylinders in the vertical position are wholly above the lower part of the body structure so that the latter can be lowered to ground level.

---

This invention is for improvements in or relating to transportable load-carrying appliances of the kind adapted to be removably received on the chassis of a transport vehicle and having a body structure provided with a plurality of extensible legs at each of two opposed sides, which legs, when extended, support the body structure from the ground at such a height, and in such a manner, that the chassis of the vehicle can be inserted, and withdrawn from, beneath the body structure.

Since a number of individual operations are to be performed of extending and contracting each of the extensible legs, and it is required for the legs to be displaced between operative and inoperative positions, together with operation of locating means for the body structure, it is highly desirable for all these operations to be performed with a minimum amount of time and labour being involved.

An object of the invention is to provide a transportable load-carrying appliance of such improved construction as to fulfil these highly desirable requirements.

The invention provides a transportable load-carrying apliance of the kind specified, wherein the legs are hydraulically extensible and contractable, and having mounting means by which the legs are mounted to the body structure for displacement between inner inoperative positions and outer operative positions, power operated actuator means for effecting said displacement, and locating means displaceable with the legs and arranged to co-operate, in the inoperative positions of the legs, with abutments on the vehicle to locate the appliance on the latter. The body structure may be a base frame, platform or chassis or a container or room.

By "inner inoperative positions" there is meant positions which the legs occupy during transport of the appliance by the vehicle; by "outer operative positions" there is meant positions which the legs occupy when they are extended, or are to be extended, to support the appliance from the ground.

Conveniently the locating means are arranged to locate the appliance sideways in relation to the vehicle chassis. Conveniently also the locating means are arranged to hold the appliance down onto the vehicle chassis. The actuator means may be hydraulic jacks incorporated in a hydraulic circuit with the hydraulic legs whereby the hydraulic legs are displaced and the locating means are operated hydraulically. In the instance of the body structure being a container, the hydraulic legs in their inner positions occupy spaces within the width of the container.

In one arrangement there are means mounting the hydraulic legs for displacement between the inner and outer positions while maintaining one of their components above the lower part of the body structure to enable lowering of the body structure to ground level. Conveniently the hydraulic legs are connected to pistons of transverse hydraulic jacks for displacement of the legs between their inner and outer positions, and helical slot and co-operating follower means co-acting between the hydraulic legs and the body structure for causing the displacement of the hydraulic legs to effect pivotal movement of the latter between substantially horizontal and vertical positions. The locating means are conveniently projections carried by the hydraulic legs and engageable with girder portions of the transport vehicle chassis. There may be runners for riding on rails. The hydraulic circuit may include admit valves operable by back pressure from the actuator means to admit pressure to the hydraulic legs and vice versa, and flow divider valves for dividing the flow of fluid equally to the hydraulic legs.

The above and other features of the invention set out in the appended claims are incorporated in the construction which will now be described, as a specific embodiment with reference to the accompanying drawings in which:

Figure 1:
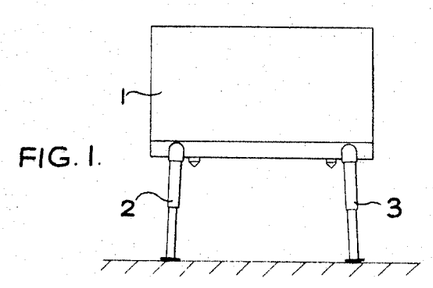
FIGURE 1 is a side view of a transportabe load-carrying appliance comprising a body structure in the form of a container having hydraulic legs according to the invention.
Figure 2:
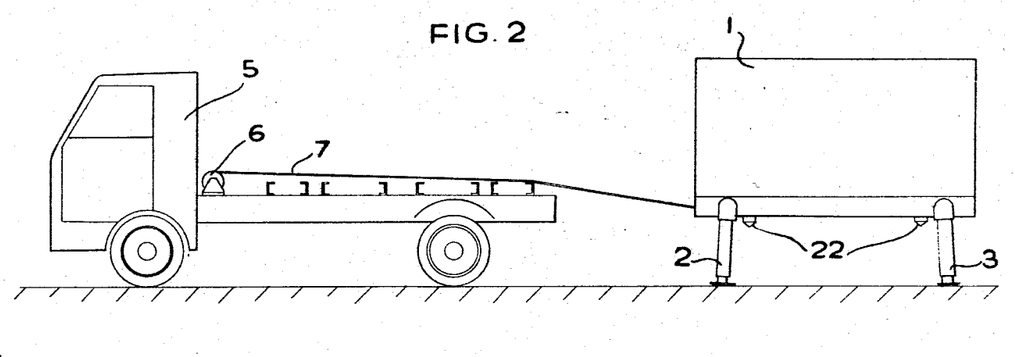
FIGURE 2 is a side view of the container connected by a reel of hydraulic flexible hose to a distant transport vehicle in the form of a lorry.
Figure 3:
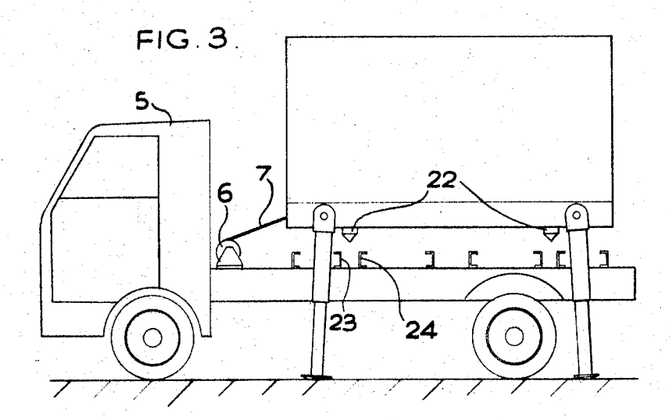
FIGURE 3 is a similar view to FIGURE 2 showing the lorry with its chassis or loading platform under the container.
Figure 4:
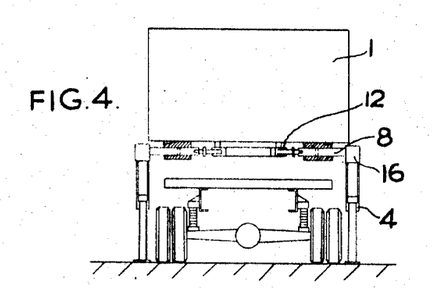
FIGURE 4 is a cross sectional view of FIGURE 3.

Referring to FIGURE 1 the transportable load-carrying appliance comprises a container body structure 1, which is of maximum official regulation width, and four hydraulic jack type legs such as 2, 3 and 4 in FIGURE 4. As shown in FIGURE 2 a lorry 5 has on it a reel 6 of hydraulic flexible hose 7 which is releasably connectable to the container 1. With the legs extended to raise the container to elevator height, FIGURE 3, the lorry 5 can be backed to carry its loading platform 5a under the container, the side legs being so much wider apart than the overall width of the lorry, i.e. over the hub caps of the rear axle, that a sufficient safety margin is allowed for. During this operation the hose 7 can be wound on the reel 6.

Figure 6:
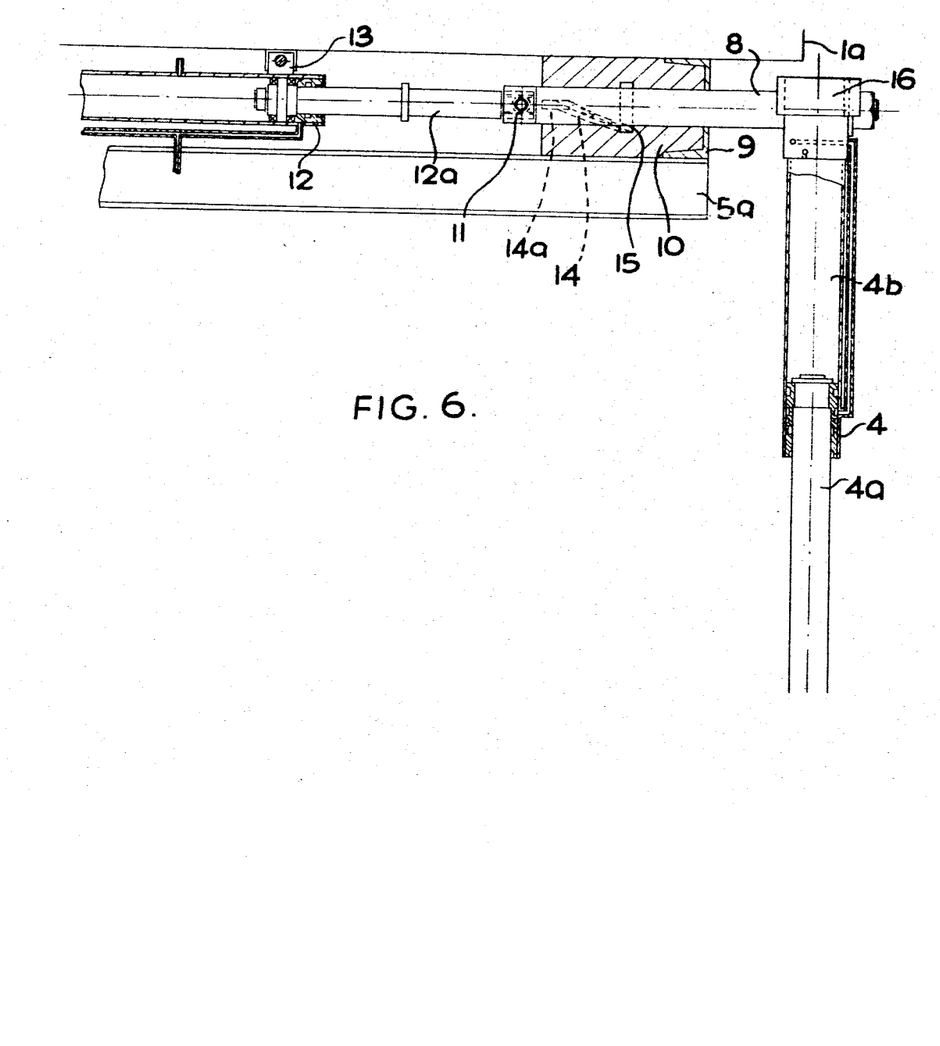
FIGURE 6 is an enlarged sectional detail view of part of FIGURE 4.

FIGURE 6 illustrates that the leg 4 (the other legs being identical) comprises a lower ram 4a operable in an upper cylinder 4b, and that the latter is mounted on an upper axle 8 extending transversely of the container through an underside girder 9 which is set back from the side 1a of the container. The leg is thus retractable, and displaceable pivotally by rotation of the axle 8, which pivots the leg at the outer end of the leg cylinder.

The axle 8 also extends through a fixed bearing block 10 in which it is slidable, and its inner projecting end is connected by a pivot 11 to the outer end of a ram 12a of a hydraulic jack 12, the latter being attached by brackets such as 13 to the underside of the container.

Figure 5:
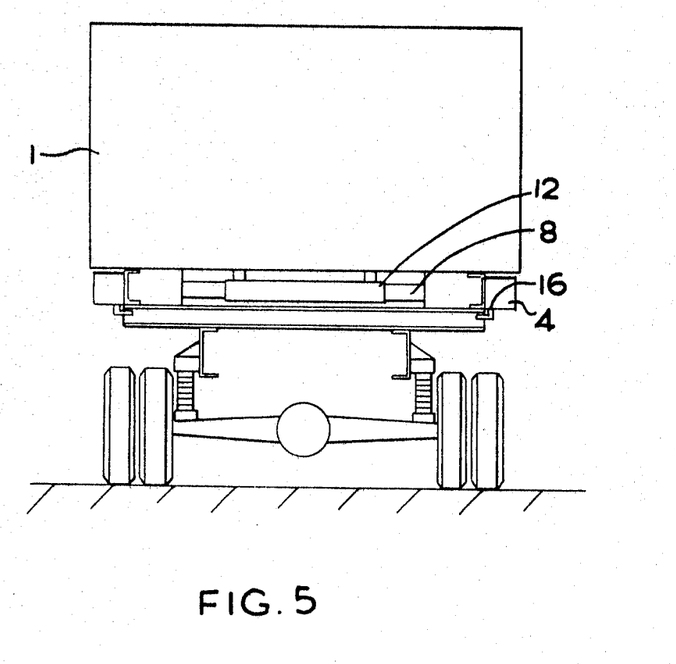
FIGURE 5 is a similar view to FIGURE 4 showing the legs displaced.
Figure 7:
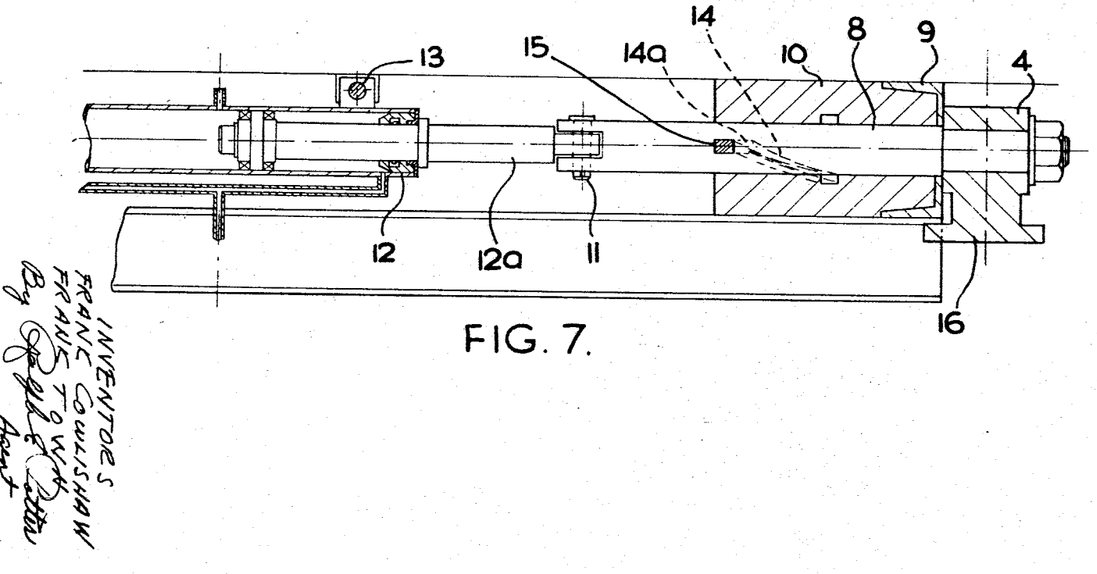
FIGURE 7 is a similar view to FIGURE 6 showing the legs displaced as in FIGURE 5.

The legs are normally spaced outwards from the girder 9 as shown in FIGURE 6, and operation of the jack 12, i.e. contraction of its ram 12a when the container has been lowered onto the lorry platform by contracting the legs, will draw the axle 8 and consequently the leg 4 inwardly. In the bearing block 10 is formed a helical groove 14 and engaging in the groove is a spigot 15 projecting from the axle 8. Thus, while the axle 8 is being drawn inwardly by the jack 12, the spigot 15 is guided by the helical groove 14 to cause rotation of the axle 8 which consequently pivotally displaces the leg into an upper horizontal position, as shown in FIGURES 5, 7. The combined movement causes the leg to become disposed horizontally under the lower edge of the container, i.e. within the width of the container so that the container does not have any part exceeding the official regulation width. Instead of being disposed under the base of the container, the legs may be disposed in recesses in the container.

Figure 8:
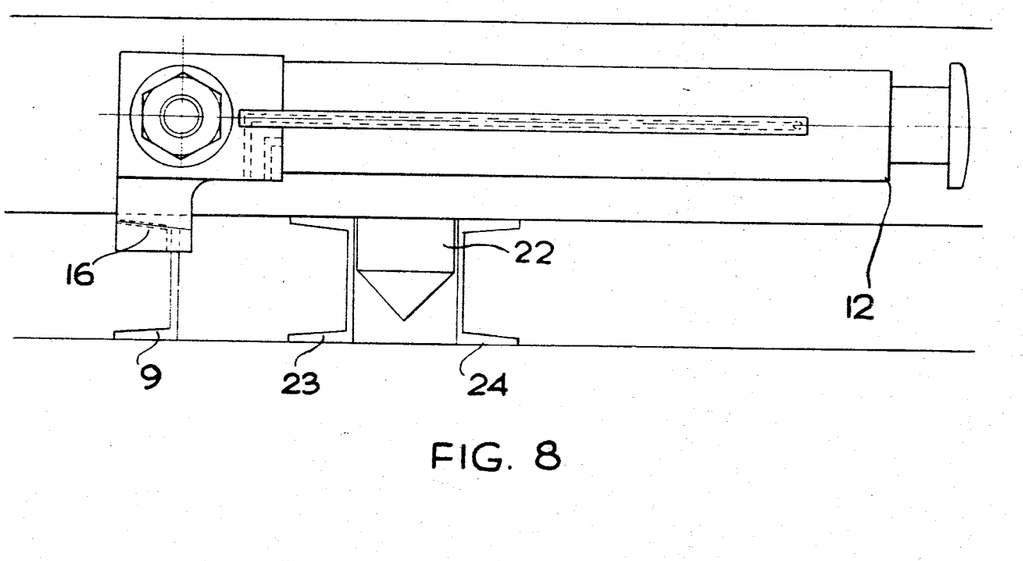
FIGURE 8 is a side view of FIGURE 7.

Each leg conveniently has a locating catch such as 16, FIGURES 6 to 8, which is secured to the leg cylinder such as 4b, and the helical groove 14 terminates in a straight axial portion 14a so that further inward movement of the axle 8 causes it to draw the catch 16 into catching engagement with an abutment part 5a of the lorry 5, and in a final inward movement of the axles such as 8 all the catches such as 16 are pulled tightly against the lorry parts such as 5a thereby to centralize the container and lock it down in relation to the lorry.

Figure 9:
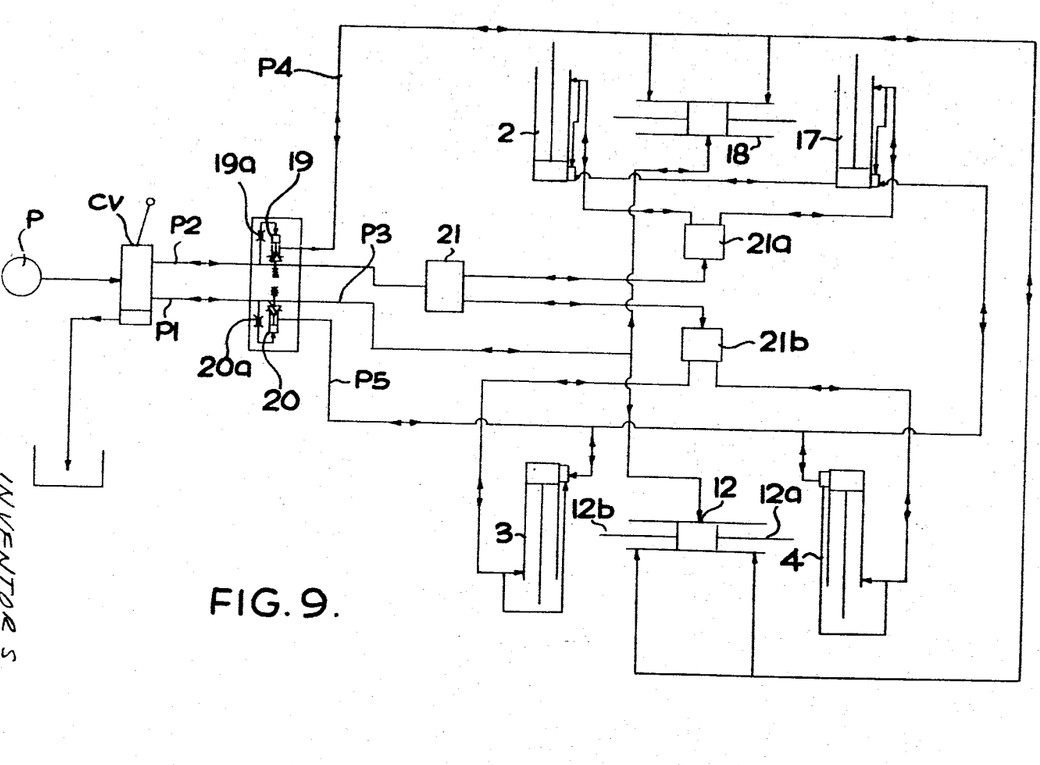
FIGURE 9 is a circuit diagram of hydraulic means for controlling the legs.

A suitable hydraulic circuit, FIGURE 9, comprises a pump P feeding from a reservoir R under control of a manually operated control valve CV, and includes the legs 2, 3, 4 and 17, the jack 12 having the ram 12a for the leg 4 and an opposite ram 12b for the leg 3, another jack 18 similar to the jack 12 and being for the legs 2, 17, admit fluid pressure operated valves 19, 20, and flow divider valves 21, 21a, 21b.

The manually operated control valve CV is of conventional two-way spool type providing two alternative fluid passages P1, P2, and a neutral position. The two fluid passages are connected to the admit valves 19, 20 respectively.

With the control valve lever in one position opening the fluid passage P1, fluid will by-pass the admit valve 20 and pass along a line P3 to between the pistons of the jacks 12, 18 respectively to extend these jacks, fluid from the annulus ends thereof passing via a line P4 to open the admit valve 19 for the fluid to pass to exhaust. When the jacks 12, 18 are fully extended, back pressure builds up in the line P3 and through a throttle valve 20a to open the admit valve 20 which then connects the pressure line P1 through a line P5 to the piston ends of the legs to extend them, fluid from the annulus ends of the legs passing through the flow divider valves 21, 21a, 21b, and by-passing the admit valve 19 to pass to exhaust. When the control valve lever is in the other position, these operations occur in reverse, using the passage P2 as the pressure line, and the admit valve 19 with a throttle valve 19a functioning similarly to the admit valve 20 and throttle valve 20a.

Figure 10:
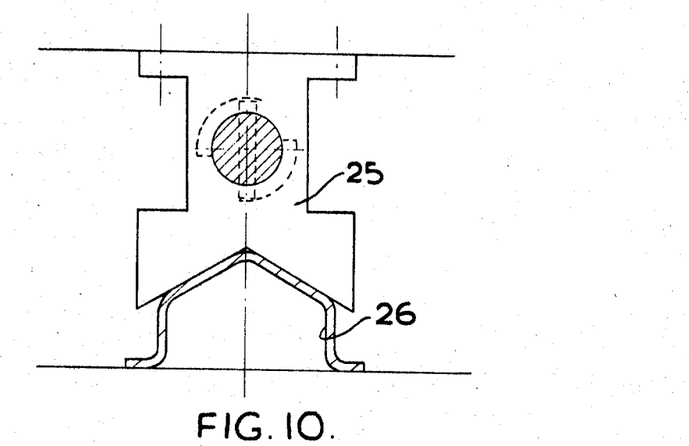
FIGURES 10 and 11 are detail views of modified locating means.
Figure 11:
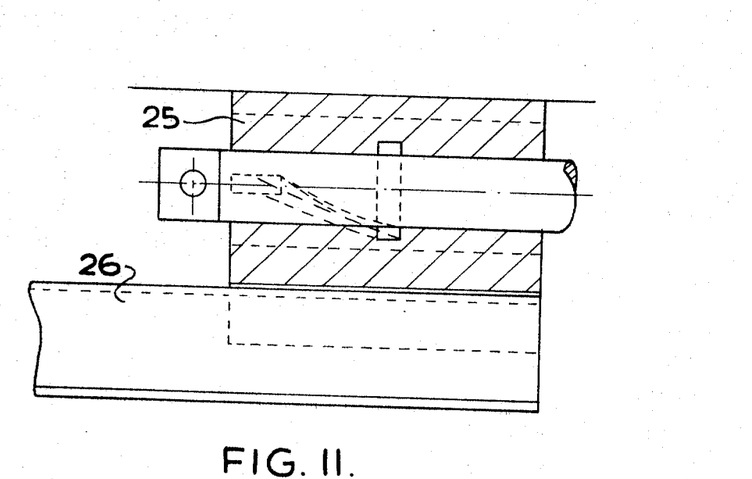

For locating the container lengthwise when lowering it onto the lorry platform there is fitted on the underside of the container a plurality of tapered members such as 22, particularly FIGURE 8, which engage between spaced girders such as 23, 24 on the lorry platform. Alternatively or in addition, FIGURES 9, 10, the bearing blocks 25 are of inverted V form engaging on inverted V guiders 26 on the lorry.

It will be appreciated from the foregoing particular description that the container can be readily loaded onto or unloaded from a transport vehicle merely by (a) operation of the vehicle, i.e. backing under or driving away from the container, (b) operation of the control valve CV to cause power operation of the jacks 12, 18, the legs 2, 3, 4, 17 and the catches 16 in one sense, and (c) further operation of the control valve CV to cause power operation of the jacks 12, 18, the legs 2, 3, 4, 17, and the catches 16 in the reverse sense, so that the loading and unloading operations can be carried out quickly and effectively if necessary with only the vehicle driver present and effecting the operations.

There may be an electric switch disposed to be operated when the container is satisfactorily loaded on the lorry platform, and the switch is connected to a visible indicating device which will indicate at any time whether or not the container is positioned satisfactorily on the lorry platform.

Figure 12:
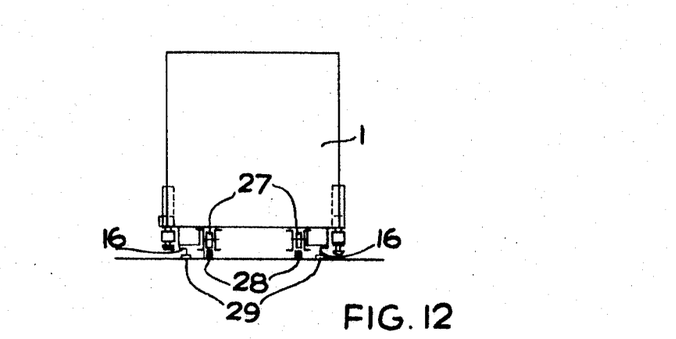
FIGURES 12 to 14 are detail views showing the container supported on ground rails.
Figure 13:
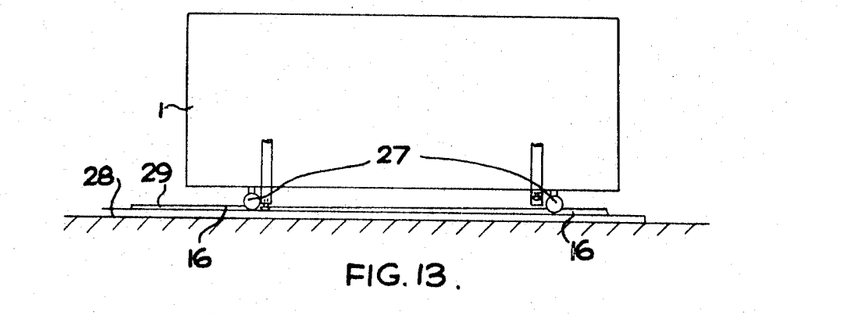
Figure 14:
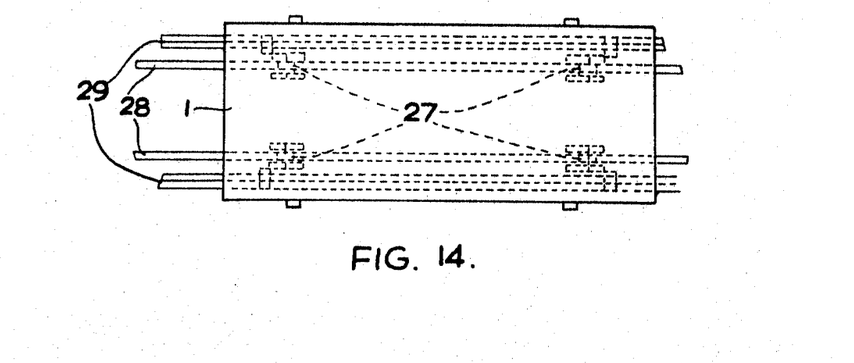
Figure 15:
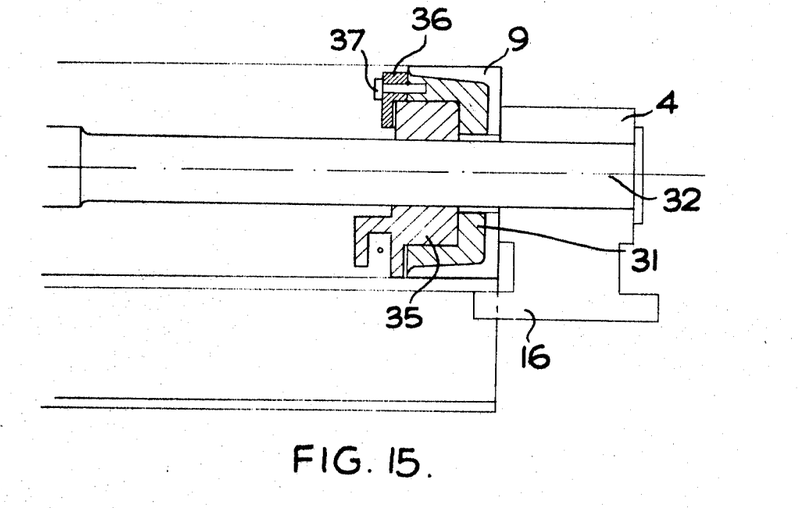
FIGURE 15 is a similar view to FIGURE 7, showing a modified arrangement.

In a modification, FIGURES 12 to 14, the legs are pivoted at locations of the inner ends of the cylinders, and the container is fitted with underside rollers 27. By this means, and with the legs in vertical position, the legs can be retracted to lower the container towards ground level whereat the rollers 27 can engage and be run along ground rails 28, and then by retraction of the axles such as 8, the catches 16 will lock the containers to the ground rails 29.

In a further modification, the helical slot 14 and spigot 15 is substituted by means for the same purpose as follows:

For each leg such as 4, a hollow block 31 is secured in the channel guider 9, and a squared shaft 32, equivalent to the shaft 8, on which the upper end of the leg is mounted extends through holes in the channel girder 9 and the block 31.

A bush 35 is rotatably mounted in the hollow block 31 and it has a squared hole through which the squared shaft extends.

Figure 16:
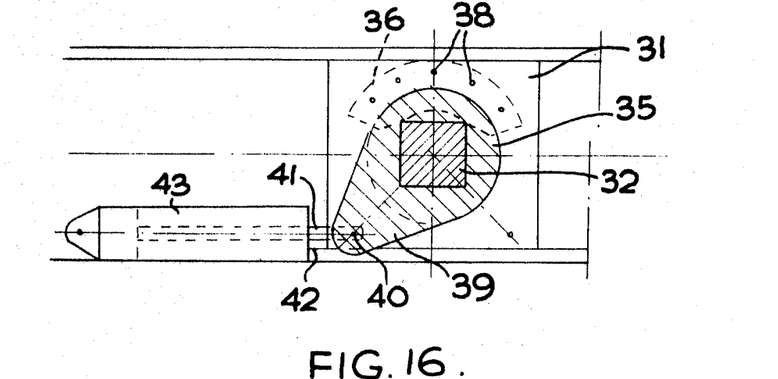
FIGURE 16 is a cross sectional view on line H—H of FIGURE 15.
Figure 17:
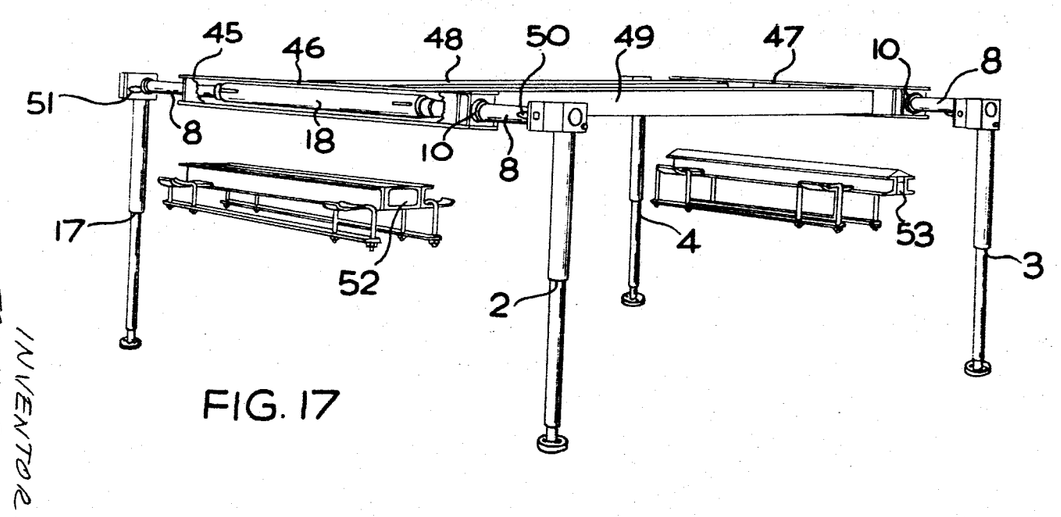
FIGURE 17 is a perspective view of a modified arrangement using a base frame.

The bush 31 is retained in position by a plate 36, which is conveniently of arcuate form, FIGURE 16, and is secured to the block 31 by a plurality of screws 37 at spaced locations 38.

A short arm 39 projects radially from the bush 35 and is connected by pivotal means 40 to a ram 41 of a small hydraulic jack 42 whereof the cylinder 43 is connected by pivotal means 44 to the girder 9 and its annular and piston ends are connected in the hydraulic circuit in parallel with the annulus and the piston ends respectively of the legs.

In operation, when loading the container onto a vehicle, the small hydraulic jacks such as 42 for the legs such as 4 are contracted, when the container is over the lorry platform, substantially simultaneously with the contraction of the legs, so that the legs are swung upwardly, by virtue of the square shaft mountings, into the required horizontal position.

Meanwhile the hydraulic jack 12 is started, to draw the legs inwardly, and, through the intermediary of the squared shafts, such as 32, the final inward movements applying the catches 16. The operations automatically reverse when controlled for unloading the container from the vehicle.

FIGURE 16 shows a modification in which the transportable load-carrying appliance is a base frame body structure 45 having the hydraulic legs 2, 3, 4, 17. This base frame 45 is provided so that a container, machinery or the like can be removably secured on it.

The base frame 4 may be of any convenient frame or platform construction for example having front and rear channel girders 46, 47 and side channel girders 48, 49, spaced a short distance inwardly from the ends of the girders 46, 47.

In the ends of the girders 46, 47 are disposed the bearing blocks 10 for the spindles 8 connecting between the legs 2, 3, 4, 17 and the double ended jacks 12, 18. The blocks may be at opposite sides of each girder 46, 47, and the jacks 12, 18 may each consist of two oppositely directed jacks on opposite sides of the respective girders 46, 47 so that they can be individually of greater length than half the length of the double ended jacks to provide for desired length of outward displacements of the legs.

Each spindle 8 has associated with it a helical slot and spigot device hereinbefore described.

Each leg 2, 3, 4, 17 also carries either a catch as hereinbefore described for centralizing and locking of the base frame in relation to a vehicle, or as shown each leg may carry a spigot such as 50, 51, for the same purpose to engage in ends 52, 53 of girders such as 52, 53 on the transport vehicle.

The hydraulic circuit hereinbefore described applies equally well to this base frame modification, although it is to be understood that the hydraulic hose reel may be dispensed with and pipe couplings of readily releasable type may be provided for releasably connecting the power source on the vehicle to the container or base frame.

The hydraulic circuit for either the container or the base frame conveniently includes pressure retaining valves suitable to ensure that collapse of the hydraulic legs is avoided in the event of a pressure drop in the system due say to a fractured pipe or pump failure.

The manually operable control valve CV for the container or base frame arrangement is conveniently of "dead man's handle" control type thereby ensuring the no movement takes place if the operator moves away from the control valve.

As an alternative to use of the power source from the vehicle, a portable power unit may be employed.

In a further modified arrangement of FIGURES 18 to 23, the container 1 has its hydraulic legs such as 54 to 56 extendible, contractable, and pivotally displaceable together with centralizing and locking by means and for the purpose hereinbefore described.

Figure 18:
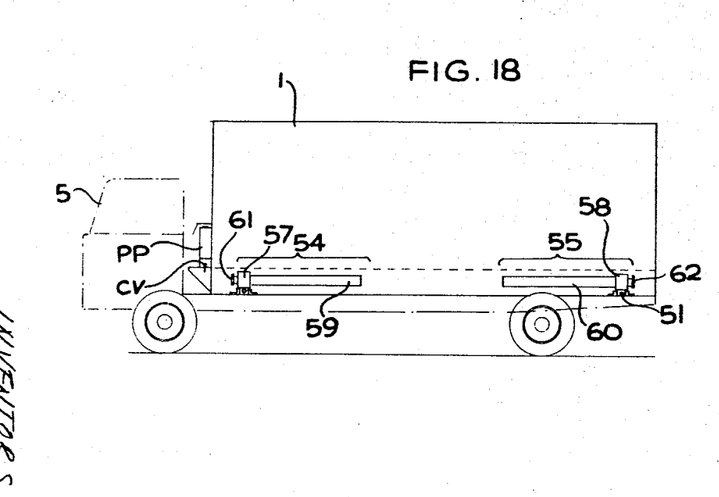
FIGURE 18 is a side view of a container with a modified hydraulic leg arrangement.

However, instead of the pivotal mountings of the hydraulic legs being at the outer ends of the leg cylinders as hereinbefore described, the pivotal mountings, as shown in FIGURE 18, are at the inner ends such as 57, 58 of the cylinders such as 59, 60.

Figure 19:
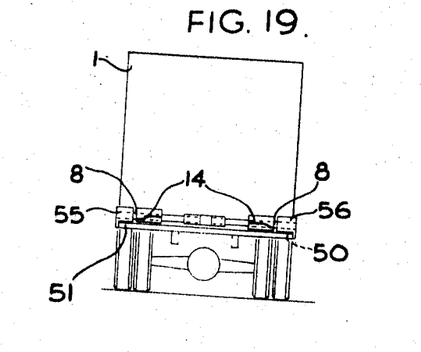
FIGURE 19 is an end view of FIGURE 18.

By this means when the legs are swung from the horizontal positions of FIGURES 18, 19 to the vertical positions FIGURES 20, 21, the leg cylinders 59, 60 swing upwardly so as not to project below the lower end of the container.

Following the extension of the legs to support the container from the ground by the pistons such as 61, 62 projecting downwardly below the lower end of the container and removal of the vehicle, the legs can then be contracted, FIGURES 22, 23, thereby withdrawing the pistons 61, 62 into the cylinders 57, 58 above the lower end of the container so that the container is then disposed at ground level which facilitates it being emptied. In reverse, an empty container at ground level can be readily filled followed by reversal of the operations of the legs to raise the container to the elevated level for loading onto the vehicle.

Figure 20:
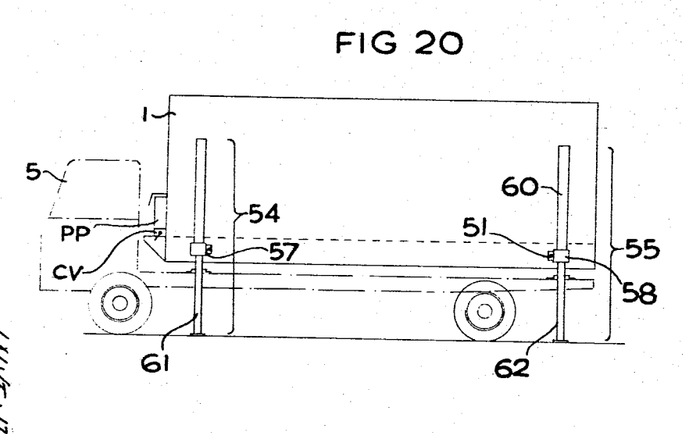
FIGURE 20 is a similar view to FIGURE 18 with the legs supporting the container over a vehicle.
Figure 21:
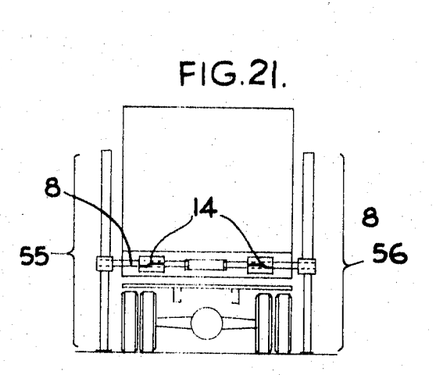
FIGURE 21 is an end view of FIGURE 20.
Figure 22:
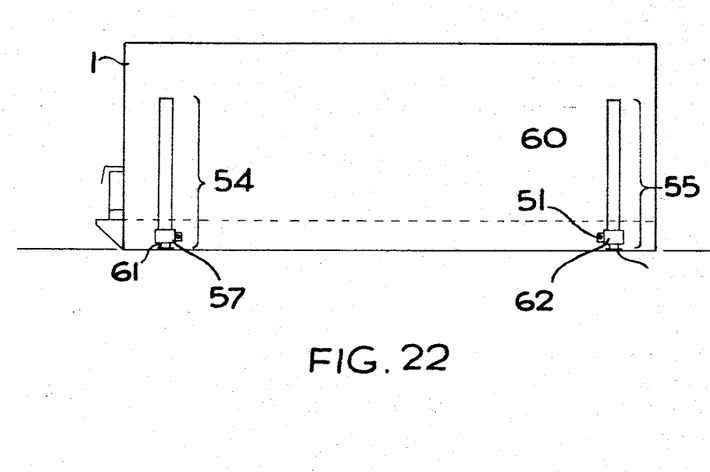
FIGURE 22 is a similar view to FIGURE 20 with the container lowered to ground level.
Figure 23:
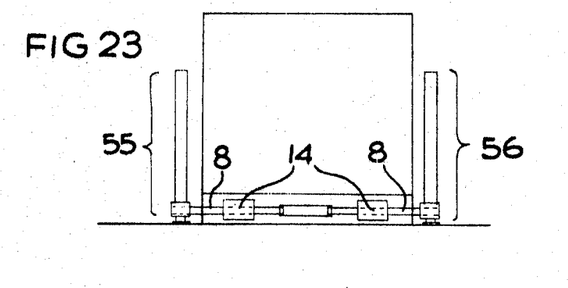
FIGURE 23 is an end view of FIGURE 22.

FIGURES 18, 20, 22 also show that the control valve CV and a power pack PP can be mounted on the container 1, or similarly they can be mounted on the base frame hereinbefore described, for control of the container or base frame independently of the vehicle or of a portable power unit.

Although in the foregoing particular description the body structure is exemplified by a container or base frame, it is to be understood that the body structure may be of any other suitable form such for example as a caravan or other room structure, or the base frame may carry a shed, greenhouse or the like.

What we claim is:

1. In combination: a transportable load-carrying body structure releasably secured for separate detachment from the chassis of a vehicle, hydraulically extensible and contractable legs for supporting the body structure separate from the vehicle chassis, mounting means for attaching the legs to the body structure for displacement between inner inoperative positions and outer operative positions, power operated actuator means for effecting said displacement, and engaging catch means on the legs and vehicle chassis that cooperate in the inoperative position of the legs to centrally locate the body structure on the vehicle chassis.

2. Apparatus according to claim 1, wherein the catch means are arranged to center the body structure sideways in relation to the vehicle chassis.

3. Apparatus according to claim 1, wherein the catch means are arranged to hold the body structure down on the vehicle chassis.

4. Apparatus according to claim 1, wherein the actuator means are hydraulic jacks incorporated in a hydraulic circuit with the hydraulic legs whereby the hydraulic legs are displaced and the catch means are operated hydraulically.

5. Apparatus according to claim 1, wherein the body structure is a container and the hydraulic legs in their inner positions occupy spaces within the width of the container.

6. Apparatus according to claim 1, having means mounting the hydraulic legs displacement between the inner and outer positions while maintaining one of their components above the lower part of the body structure to enable lowering of the body structure to ground level.

7. Apparatus according to claim 1 wherein the hydraulic legs are connected to pistons of transverse hydraulic jacks for displacement of the legs between their inner and outer positions, and helical slot and co-operating follower means co-acting between the hydraulic legs and the body structure for causing the displacement of the hydraulic legs to effect pivotal movement of the latter between substantially horizontal and vertical positions.

8. Apparatus according to claim 1, wherein the catch means are projections carried by the hydraulic legs and engageable with girder portions of the transport vehicle chassis.

9. Apparatus according to claim 1, having runners on the body structure for riding on rails on the vehicle chassis.

10. Apparatus according to claim 1, having in the hydraulic circuit, admit valves operable by back pressure from the actuator means to admit pressure to the hydraulic legs and vice versa, and flow divider valves for dividing the flow of fluid equally to the hydraulic legs.

References Cited

UNITED STATES PATENTS

| 2,925,930 | 2/1960 | Parks | 214—515 |
| 3,180,601 | 4/1965 | Belt | 214—515 X |
| 3,332,661 | 7/1967 | Hand | 214—515 XR |

ALBERT J. MAKAY, Primary Examiner

U.S. Cl. X.R.

296—35